United States Patent [19]
Schaefer et al.

[11] Patent Number: 5,881,444
[45] Date of Patent: Mar. 16, 1999

[54] TECHNIQUES FOR TRANSFERRING HOLOGRAMS INTO METAL SURFACES

[75] Inventors: Mark W. Schaefer, Knoxville, Tenn.;
Thomas L. Levendusky, Greensburg;
Simon Sheu, Murrysville, both of Pa.;
Robert B. Larsen, Maryville, Tenn.;
Neville C. Whittle, Pittsburgh, Pa.

[73] Assignee: Aluminum Company of America, Pittsburgh, Pa.

[21] Appl. No.: 991,101

[22] Filed: Dec. 12, 1997

[51] Int. Cl.$^6$ .................................................. B21B 1/46
[52] U.S. Cl. .............................. 29/527.1; 72/349; 101/32
[58] Field of Search .......................... 29/469.5; 72/349; 101/32

[56] References Cited

U.S. PATENT DOCUMENTS

| | | |
|---|---|---|
| 3,048,512 | 8/1962 | Nelson . |
| 3,244,094 | 4/1966 | Gresham . |
| 3,733,258 | 5/1973 | Hanak et al. . |
| 3,875,026 | 4/1975 | Widmer . |
| 3,944,420 | 3/1976 | Gale et al. . |
| 4,368,979 | 1/1983 | Ruell . |
| 4,684,795 | 8/1987 | Colgate, Jr. . |
| 4,725,111 | 2/1988 | Weitzen et al. . |
| 4,741,266 | 5/1988 | Stirbis et al. . |
| 4,773,718 | 9/1988 | Weitzen et al. . |
| 4,856,857 | 8/1989 | Takeuchi et al. . |
| 4,913,858 | 4/1990 | Miekka et al. . |
| 4,971,646 | 11/1990 | Schell et al. . |
| 4,999,075 | 3/1991 | Coburn, Jr. . |
| 5,059,499 | 10/1991 | Teitel . |
| 5,111,572 | 5/1992 | Haimi . |
| 5,227,897 | 7/1993 | Fohrman et al. . |
| 5,267,753 | 12/1993 | Chock . |
| 5,327,825 | 7/1994 | Parker et al. . |
| 5,370,763 | 12/1994 | Curiel . |
| 5,521,030 | 5/1996 | McGrew . |

OTHER PUBLICATIONS

Research Disclosure 290122 Jun. 10, 1988.
Multi–Arc Scientific Coatings Catalog, "Advanced ION Bond ® Coatings".
"Amorphous Diamond Coating Developed", *Medical Product Manufacturing News*, Jan./Feb. 1997.
Richard Horsfall, "Amorphous Diamond Shapes Up", *Cutting Tool Engineering*, vol. 49, No. 5, Aug. 1997.
"Tetrabond® (Tetrahedral Amorphous Diamond)—Most Commonly Asked Questions" (no date).
Bernard F. Coll, Manish Chhlowalla, "Amorphous diamond film by enhanced arc deposition", *Surface and Coatings Technology*, 79(1996), pp. 76–85.
Glenn Johnson and Oliver Sparkman, "The Future of Small Hole Drilling?", *Drilling Advances* (no date).
"What Is A Diffraction Grating?", The Diffraction Co. (No date).

*Primary Examiner*—Carl J. Arbes
*Attorney, Agent, or Firm*—David W. Brownlee; Edward L. Levine

[57] ABSTRACT

A method for impressing holographic images or holograms in the surface of metal objects such as aluminum cans. The surfaces of metal shims and print rolls bearing holograms are hardened as by coating them with thin amorphous diamond coatings or diamond like coatings so the holograms can be embossed into many thousands of metal cans with clarity and consistency.

48 Claims, 4 Drawing Sheets

TECHNIQUES FOR TRANSFERRING HOLOGRAMS INTO METAL SURFACES

BACKGROUND OF THE INVENTION

1. Field of the Invention

This invention relates to pressing or transferring holograms and/or diffraction images into metallic surfaces such as metal cans.

2. Description of the Prior Art

It is well known to manufacture a variety of products having holograms or diffraction images pressed or embossed into them. Such products include credit cards, license plates, consumer packaging, pictures, tickets and the like. See, for example, U.S. Pat. Nos. 4,368,979; 4,684,795; 4,856,857; 4,971,646; 4,999,075; and 5,267,753. Holograms generally mean a diffraction pattern which produces a three-dimensional image. Other diffraction images modify the behavior of light that strikes an object bearing the image without creating a three-dimensional appearance. The term "hologram" is used herein in the broad sense to include diffraction patterns or images as well as three-dimensional holograms and other complex images having different planes of diffraction. The manufacture of holograms, shims or plates is well known in the art as disclosed in U.S. Pat. Nos. 3,733,258; 3,875,026; 3,944,420; and 5,059,499, among others.

Most holograms on credit cards and the like are embossed into a plastic sheet material such as Mylar® or other polyester which has a thin underlayer of reflective material such as aluminum to produce a reflective hologram. The aluminum is typically vapor deposited onto the substrate. Holograms can also be impressed into thermoplastic layers on durable substrates as disclosed in U.S. Pat. No. 4,913,858. The coated sheet is heated to soften the coating which is decorated using an embossing member to provide a diffraction pattern or hologram.

It is further known to create embossing tools or roller dies bearing holographic patterns which are impressed into aluminum foil, translucent plastics and other materials, as is disclosed in U.S. Pat. No. 5,521,030. That patent discloses a process in which the holographic pattern is etched directly into a durable surface on the tool or die. The patent states that large quantities of holograms can be made from a single die made of high quality steel, chrome, or the like that is used in the roller die. The patent further states that the die may be a flat plate mounted on a substrate, an inside surface of an injection mold, a mandrel, a casting mold, or other surface used for transferring a relief pattern.

It is also known to emboss holograms directly into the outer surface of sheet metal such as aluminum foil and aluminum beverage cans as is disclosed in U.S. Pat. Nos. 4,773,718 and 4,725,111. Those patents explain that the temperature of the aluminum is important for optimizing the embossing process and that the nickel master plate must be many times less deformable at the embossing temperature than is the material being embossed. The patents describe a process in which the aluminum foil and aluminum cans are heated to reduce the yield strength of the metal. The yield strength of the nickel master is relatively constant over the temperature range in which the yield strength of the aluminum in the foil and cans is dramatically reduced. The patents disclose embossing apparatus having a metal embossing plate carried on the outside surface of a wheel which is pressed against a can mounted on a mandrel. The embossing plate is heated by a heater that may be disposed within the wheel. The machine has a plurality of mandrels for cans which are sequentially embossed. The mandrels are preferably cooled. The process disclosed by these patents has not been used commercially despite the desirability of enhancing the decoration of cans.

An improved low cost technique is desired for embossing holograms into metal cans and other objects. Many billions of aluminum beer and beverage cans are made and sold annually, and improved decoration of such cans would improve their marketability. Aluminum cans are made from hard temper aluminum alloys, and the sidewalls of the cans are quite thin such as in the range of about 0.0038 to 0.0042 inch. The cans are typically filled with carbonated beverages which produce pressures of 90–110 psi or more within the cans. The cans are commonly closed with a lid that is secured on the cans by a double seamer that applies a top load of about 100 to 130 pounds on the can during the seaming operation. It is important that the temper and strength of aluminum cans not be unduly reduced during processing as can happen if the cans are heated.

A technique for embossing holograms on cans is needed which adds little to the cost of the cans and which produces consistently high quality images. It is desirable for a manufacturing system to be capable of embossing holograms on approximately 2.5 million cans per day in order to be commercially practicable. Bottlers demand high quality cans and will not accept noticeable variations in the decoration on their cans. Moreover, the commercial can manufacturing and filling processes operate at high speeds of 600 to 2000 cans per minute, and can decoration processes must be statistically in control and capable at such speeds.

SUMMARY OF THE INVENTION

The present invention meets the above-described needs by providing a process for producing a master die that can be used to manufacture many thousands of high quality decorated aluminum cans or other metal products at high speeds. The cost of decorating aluminum cans or other metal products by this invention is nominal and is economical for mass marketing of the products.

This invention uses a positive nickel shim having a holographic pattern in it, which is produced by conventional methods, to manufacture multiple master dies for decorating metallic products. The master die may be in the form of a print roll or flexible sheet metal into which the holographic pattern is transferred. The master die is made of metal having a suitable hardness relative to the nickel shim in order to make a high quality transfer of the image from the shim to the master die. It is preferred that the nickel shim must have a hardness which is at least about 2.5 times the hardness of the material at the surface of the master dies.

Following transfer of the pattern from the shim to the master die or dies, the surface of the dies are hardened as for example by putting an amorphous diamond coating (ADC) or a diamond like coating (DLC) on them. The coating is very thin and of uniform thickness to minimize possible adverse effect on the clarity of the holographic pattern, while being thick enough to provide the requisite hardness for embossing many thousands of cans.

It is an object of this invention to provide a method for embossing holograms into the exterior surface of metal objects such as cans, can ends, metal sheet or the like.

Another object of this invention is to provide a method for economically embossing holograms having uniformity and clarity into many thousands of metal cans or can bodies with the same dies.

A further object is to provide a method and apparatus for decorating cans with holograms and decorative coatings at high speeds for mass production of aluminum cans without adversely affecting the mechanical properties of the cans.

Another object is to provide improved hologram-decorated cans.

Yet another object is to provide a method for producing print rolls having holographic images on them which are suitable for embossing hundreds of thousands of metal articles such as steel or aluminum cans or can ends.

The above and other objects and advantages of this invention will be more fully understood and appreciated with reference to the attached drawings and the following description of the invention.

DESCRIPTION OF THE PREFERRED EMBODIMENTS

According to the present invention, metal cans or other objects have holographic images or holograms embossed in their surfaces by print rolls having the negative of the images impressed in their roll surfaces. Metal cans that are embossed in accordance with this invention are preferably made of hard temper aluminum alloys such as 3004 H-19 aluminum. The cans are typically made by drawing a cup and ironing the sidewall of the cup to thin and lengthen the sidewall and make a D&I can body as is well known in the art. The D&I cans produced by such processing usually have a thin wall portion extending for substantially the entire length of the can body except for the top inch or so which is a thick wall portion. In order to be used in commercial packaging, the yield strength of the D&I cans must not be significantly reduced during decoration as can result from heating since the cans must be capable of withstanding the handling and processing involved in filling and closing the cans and to withstand the internal pressures generated by carbonated beverages, beer and other products packaged in the cans.

Cans which are embossed in accordance with this invention preferably have high specularity or brightness in order to produce the desired clarity of the hologram in the surface of the can. This means that the cans preferably have a substantially mirror-like surface characterized by having a high distinctness of reflected image ("D/I" for brevity). When a can having a high D/I is positioned adjacent an article or an image or printing on paper or the like, the image or reflection on the can should be clear. D/I is the sharpness of the reflected image, and is preferably in a range of at least about 50 to 70% for cans to be embossed by the method of this invention. High specularity can be produced on the cans in a variety of ways such as burnishing or buffing the exterior surfaces of the cans or by chemically cleaning and etching the cans. However, D/I body makers produce can bodies having specularity levels, after being washed, which may be high enough for transfer of holograms to the can bodies without further brightening.

Figure 1:
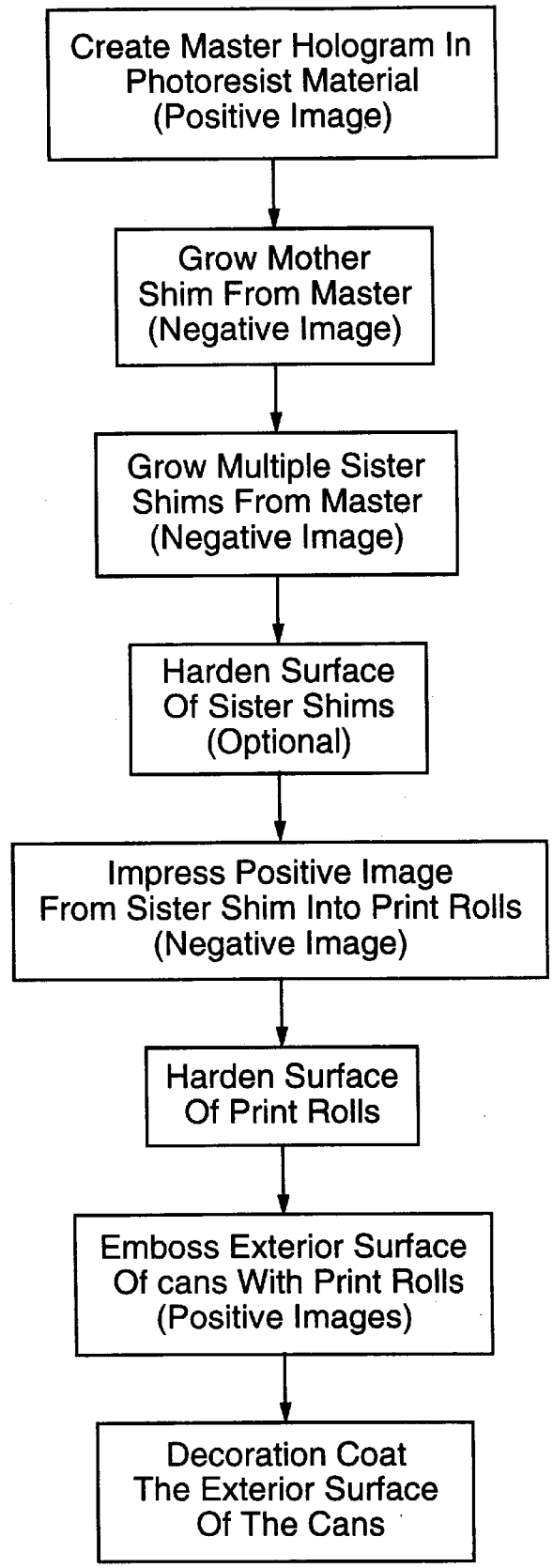
FIG. 1 is a flow diagram showing the steps employed to emboss aluminum cans with holograms in accordance with this invention.

Referring to the drawings, FIG. 1 outlines a preferred process for embossing holograms in metal cans and applying a decorative coating to the cans after they have been embossed. The first step of the process is to create a master hologram as is well known in the art. One common process is to apply a photosensitive coating (photoresist) to a substrate such as glass or metal and to etch the photoresist with two or more coherent beams of light (laser beams) to produce a surface relief pattern (hologram) with a depth corresponding to the intensity of the radiation at each point. The relief grooves that are etched into the photoresist preferably have a depth of about 500–1000 nanometers and may have an aspect ratio of depth to width in a range of about 1:1 to 3:1. The master hologram that is produced in the photoresist material is fragile and relatively soft.

The next step, which is also well known in the art, is to grow a metal shim or mother shim from the master hologram. This can be done by putting the master hologram in a bath of metal salts such as nickel salts and electrolytically growing or depositing nickel on the master hologram to generate a negative image of the hologram in a nickel shim. The thickness of the metal (nickel) shim varies depending on several factors such as the growing time used. The nickel shim is peeled or stripped from the master hologram to expose the negative image in the surface of the mother shim.

The next step in the process is to create multiple shims from the mother shim. It is known in the art to produce 100 or more daughters of the mother shim. This is done by growing daughters of the mother shim (sister shims of each other) in a bath of metal salts in the same manner that the mother shim was grown on the master hologram as described above. In this way many sister shims are grown. The negative image on the mother shim becomes a positive image on each of the sister shims. It is important that the surfaces of the mother shim and the sister shims be as smooth as possible to avoid pressing any imperfections from such surfaces into the hologram images made from the shims. It is also important that the undersurface of the sister shims be smooth. Since the shims are relatively thin, small blemishes on the undersurface of the shims or on surfaces on which the shims are mounted can be transferred through the shims into the holograms produced by the shims.

Optionally, the hologram surface of the sister shims may be hardened. This can be done in a variety of ways such as ion implantation with a nitrogen plasma and/or by coating the hologram surface with a thin diamond-like carbon (DLC) coating or amorphous diamond coating (ADC) or diamond-like carbon films. The coatings or films may be formed on the surface of the shims by high temperature chemical vapor deposition (CVD) or enhanced cathodic-arc physical vapor deposition processes that create a high energy flux of carbon ions that are caused to be embedded in the surface of the shim. DLC coatings can also be applied by low temperature physical vapor deposition (PVD) such as cathodic arc deposition of the coating. The physical and mechanical properties of the shim substrate remains substantially unaffected by the coating process, but the coating on the surface has a hardness approaching that of natural diamond. The coating is tightly bonded to the shim substrate and is abrasion resistant. Due to the amorphous nature of the ADC, it requires no post-coating polishing. The coating is continuous and homogeneous and substantially exactly replicates the underlying surface so it does not noticeably degrade the topography of the hologram image. The Tetrabond® Division of Multi-Arc Inc. in Rockaway, N.J. applies TETRABOND® coatings or other similar coatings on a variety of products for various uses and also supplies equipment for applying such coatings.

The ADC or DLC coating or film is preferably less than about 3000 angstroms thick in order to minimize masking or dulling of the hologram in the surface. ADC coatings may have hardness in a range of about 80–100 Gpa (giga pascal) (8,000–10,000 Vickers), be optically smooth and have a high adherence to the shim substrate. DLC coatings may have hardness in a range of about 10–50 Gpa (1,000–5,000 Vickers). The Gpa hardness measure is used by Multi-Arc Inc., whereas $kg/mm^2$ (kilograms per square millimeter) is used below to measure hardness of shims, metal rolls and cans. Vickers and Rockwell hardness can also be used to measure surface hardness. One $kg/mm^2$ is the equivalent of one Newton/mm in the meter-kilogram-second system. Hardness measurements depend on the nature and size of the indenters, and there are no generally accepted conversion factors from one unit of measurement to another.

The sister shims preferably have a surface hardness of approximately 550–600 $kg/mm^2$, regardless of whether their surface has been hardened as described above. It is important to provide a sufficient surface hardness on the shims to effect a transfer of the hologram image into the surface of a print roll in the next step of the process. It is preferred that effective transfer of a hologram image from the shim to the print roll employ a hardness ratio of the two surfaces of at least about 2.5 to 1 and preferably at least about 2.7 to 1. This means that the surface from which the image is being transferred should be at least about 2.5 times, and preferably at least 4 to 5, harder than the surface into which the image is being impressed.

Figure 2:
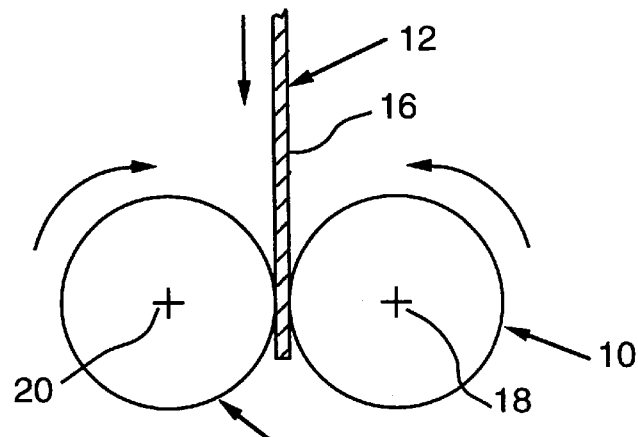
FIG. 2 is a cross-sectional view showing transfer of a hologram image from a shim to a print roll to be used to emboss cans in accordance with this invention.

The next step in the method of this invention is to transfer the positive image from a sister shim into the surface of a print roll or rolls. This is illustrated in FIG. 2. The support rolls are preferably polished aluminum cylinders made from an aluminum alloy such as 6061, 7075 or other 6000 and 7000 series alloys and have a surface hardness of about 110–125 $kg/mm^2$. Print rolls made of 2024 or 4045 aluminum alloys, or other lower yield strength aluminum alloys, may also be suitable for some applications. However, print rolls made of higher yield strength alloys, such as 7075 aluminum alloy, appear to be more robust and capable of more cycles of operation than rolls made of lower yield strength alloys.

The print rolls are preferably either acid or alkaline cleaned and then polished, buffed or bright dipped before the hologram is pressed into their surface. A variety of known mechanical and/or chemical processes may be used to provide a smooth, bright finish on the print rolls. A bright finish on the print rolls is beneficial for transfer of a hologram image to the print roll and perhaps even more beneficial for transfer of the image to can bodies. Each print roll preferably has a diameter that is close or equal to the diameter of the cans which are to be embossed by the print rolls. A typical 12 oz. aluminum can has a diameter of approximately 2.6 inches, so the print rolls also preferably have diameters of about 2.6 inches. Such roll diameter is also convenient for mounting the rolls in commercial can decoration apparatus as will be described.

It is also believed that the yield strength of the print roll substrate under the surface coating affects the quality of image transfer onto the surface of cans. If the underlying substrate metal in the print roll has a low yield strength, the metal may not provide sufficient support for the hardened surface of the print roll under the pressures required to make the transfer. It is therefore believed that the high yield strength aluminum alloys such as 6000 and 7000 series alloys are beneficial to making a good image transfer. It is noted that in the use of such rolls to transfer images to thousands of cans, little or no spalling or flaking of the ADC coatings from the rolls has occurred or been observed.

Each print roll 10 may have a length approximately equal to the length or sidewall height of the thin wall portion of the cans to be embossed. Again a typical 12 oz. can has a thin wall height of about 3.0 inches, so the print rolls are also preferably about 3.0 inches in length.

Each sister shim 12 having a hologram image on it is also preferably sized to correspond to the size of the surface area of cans to be embossed and the print rolls. For example, in a preferred embodiment, about 8.168 inches of can sidewall circumference and 3 inches of can wall height is embossed. Thus, the shim 12 is preferably about 8.168 inches by about 3 inches. However, the diameter and length of the print rolls is not critical to this invention.

As shown in FIG. 2, the shim 12 is pressed against the bright finished (mirror-like finish) print roll 10 by a support roll 14. The image 16 on the shim 12 faces the print roll so the hologram image will be pressed into the surface of the print roll. The support roll 14 has a smooth surface to avoid impressing blemishes from the roll through the shim and into the print roll. As stated above, the surface hardness of the print rolls is preferably approximately 110–125 $kg/mm^2$.

It is important that the axes 18 and 20 of the print roll 10 and support roll 14 are parallel and that the rolls are as round in cross section as reasonably possible to make a good transfer of the hologram image into the print roll. The linear surfaces of the rolls 10, 14 from end to end should also be straight or preferably slightly crowned to make a good transfer of the image into the print roll. The rolls are rigidly mounted to minimize deflection in the rolls during the image transfer. The rolls are pressed against the shim as it moves between them under a linear pressure of about 500–700 pounds per linear inch of the contact surface between each roll and the shim. The rolls 10, 14 are rotated as shown by the arrows, and the shim 12 moves through [th]e nip between the rolls. Care must be used to insure that the shim is properly aligned as it passes through the nip between the rolls and to prevent slippage between the shim and print roll.

Following transfer of the holographic image to the print rolls, the surfaces of the rolls are hardened. This can be done by ion implantation or by coating the rolls with ADC or DLC as described above with reference to the sister shims. The ADC or DLC is also believed to be beneficial to reducing oxide or other scum build-up on the print rolls when they are used to emboss cans as described below. The surfaces of the print rolls preferably have a minimum hardness of at least 545 to 600 $kg/mm^2$ after they have been hardened. The surfaces of the print rolls should be at least 2.5 times, and preferably at least about 4 to 5 aluminum cans to be decorated. Aluminum cans have surface hardness of about 110–125 $kg/mm^2$ and a surface hardness on the print rolls of at least about 545–600 $kg/mm^2$ is required to make a good transfer of the image into the surface of the cans.

Figure 3:
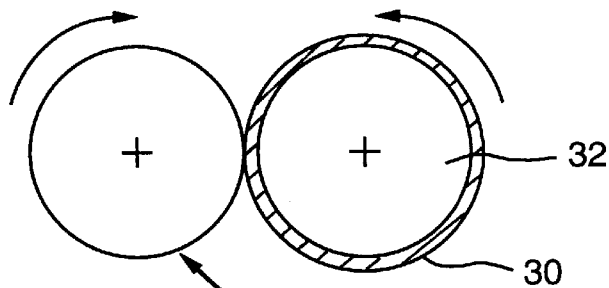
FIG. 3 is a cross-sectional view showing embossing of a hologram image from a print roll into the surface of an aluminum can.
Figure 4:
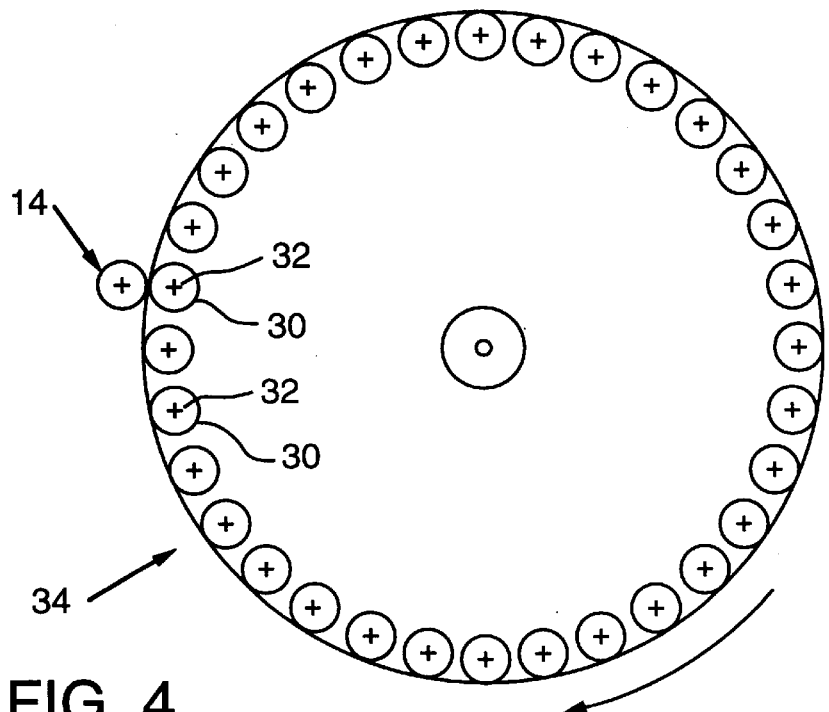
FIG. 4 is a schematic view showing a decorator apparatus having a plurality of mandrels on it for embossing holograms into can surfaces and applying decorative coatings to the embossed cans.

The next step in the method of this invention is to emboss the exterior surface of cans as shown in FIGS. 3 and 4. An aluminum can or cans 30 are positioned on a mandrel or mandrels 32 to support the cans against the force of a print roll 14. The print roll 14 is pressed against the surface of the can as the mandrel and the print roll are rotated as indicated by the arrows in FIG. 3. As described above with respect to image transfer from a sister shim to a print roll, the axes of the mandrel and the print roll must be parallel and the linear surfaces from end-to-end of the mandrel and print roll must be as straight as reasonably possible or alternatively have a slight crown on the print roll. The pressure of the print roll against the can surface is preferably about 500 to 700 pounds per linear inch of contact at the can/print roll interface. The pressure must be sufficient to emboss the holographic image from the print roll into the surface of the can, but should not be so high as to significantly extrude metal in the can sidewall between the print roll 14 and the mandrel 32. Extrusion of metal in the sidewall causes thinning of the sidewall and may deform the can. Only a small amount of thinning of the sidewall is acceptable The print rolls may be heated slightly up to about 75°–225° to improve transfer of the image into the surface of the cans.

Due to the high pressure required to transfer the holographic image from the print roll to the can and the fact that the mandrel 32 is necessarily a cantilever on which the cup-shaped can is positioned, some deflection of the mandrel is difficult to avoid. Deflection of the mandrel may result in non-uniform pressure of the print roll 14 against the can 30 from one end of the can to the other, and may produce unsatisfactory transfer of the image. Accordingly, supplemental means may be desirable to equalize the transfer pressure along the length of the can. Such supplemental means may comprise applying a greater pressure of the print roll against the can at the unsupported end of the mandrel, angling the axis of the mandrel toward the axis of the print roll so the mandrel is "toed-in" from the base of the mandrel to the unsupported end of the mandrel, or by providing a backup roll for the mandrel/can if this can be done without significantly degrading the quality of the image on the can.

Production apparatus that includes a transfer wheel 34 for transferring holograms from print rolls to drawn and ironed (D&I) can bodies may have a plurality of mandrels 32 for mounting D&I can bodies 30, as is shown in FIG. 4. It is believed that apparatus currently used for applying decorative coatings to can bodies is suitable for embossing holograms into the surface of cans. U.S. Pat. No. 4,741,266 illustrates and describes such an apparatus for decorating can bodies. The disclosure contained in the patent is incorporated herein by reference. As shown in FIG. 4, the mandrels 32 with D&I can bodies 30 on them are rotated around the transfer wheel 34 and rotated seriatim against the print roll 14 to transfer a hologram image from the print roll onto the surface of the can bodies.

It is noted that the combination of a holographic image and decorative coatings on a can produces an extremely attractive can. The decorative coating may be applied only to the surface of the can which doesn't include the hologram, or may also be applied over all or part of the hologram. The hologram and decorative coating interact to produce an appearance not previously possible in the manufacture of cans.

EXAMPLES

Figure 5:
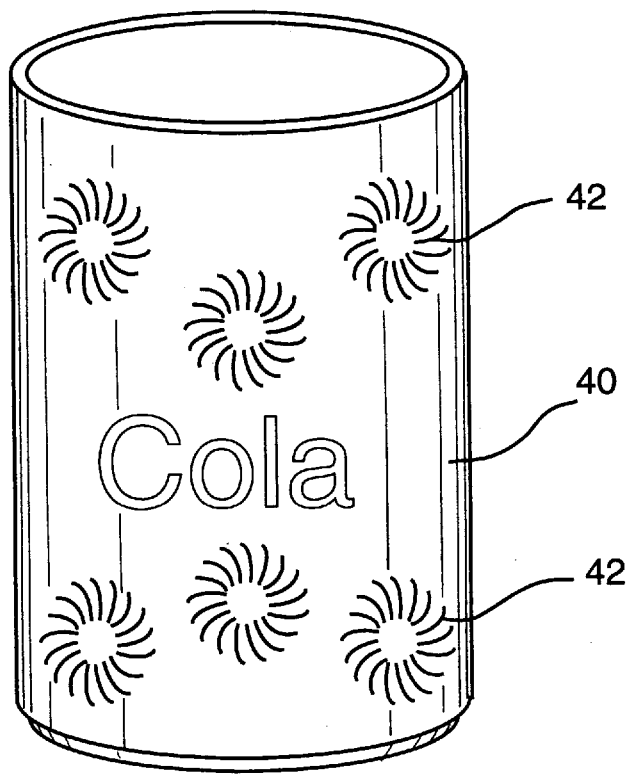
FIG. 5 is a hologram-decorated can that has been embossed in accordance with this invention.

FIG. 5 shows one example of aluminum can bodies 40 that have been decorated by the method of this invention having a hologram comprising the word "COLA" and a plurality of "galaxies" 42 embossed on its surface. The light which reflects off the hologram produces varying looks or images as the can is moved in the light. The hologram image has been transferred to the thin wall portion only of the can bodies to minimize problems with the differential in thickness between the thin wall and thick wall portions of D&I can sidewalls. However, it is believed that this invention may be used to transfer holographic images to both the thin wall and thick wall portions of the can sidewall.

In another application of this invention, two holographic images have been sequentially applied on the exterior surfaces of aluminum cans. One image was a plurality of stars and the other image was a galaxy image similar to that shown in FIG. 5. Some cans were embossed first with the stars followed by the galaxy and others were embossed first with the galaxy image and then the stars.

Figure 6:
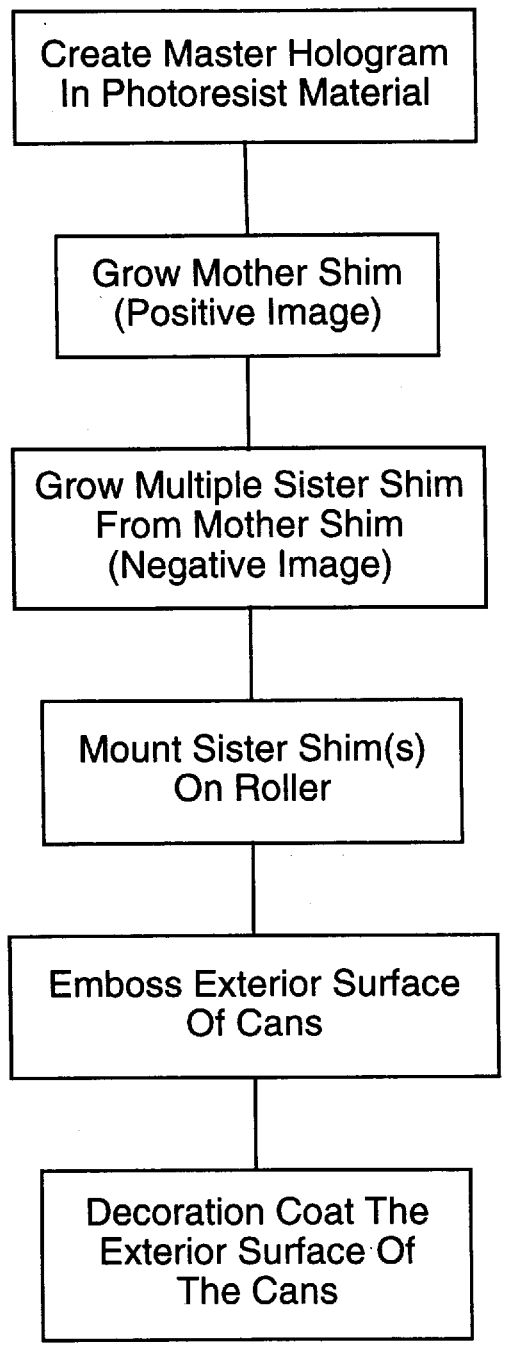
FIG. 6 is a flow diagram showing the steps in an alternative mode for embossing cans with holograms.

FIG. 6 is a flow diagram of an alternative mode for practicing the invention. In this mode the sister shims are mounted directly on a roller which is used to emboss the exterior surface of aluminum cans. In this way it is not necessary to first transfer the image from the sister shim to a print roll as in the method of FIG. 1. The sister shims that are mounted on the roller are preferably arcuate in cross-section and fit against the arcuate outer surface of the roller and secured thereto. In one example two such arcuate shims having a curved arc length of about 8 inches were mounted around a roll having a diameter of about 10.4 inches (32 inches in circumference).

The shims in the method of FIG. 6 have negative holographic images on them and press a positive image in the exterior surface of cans. It is important to the method of FIG. 6 that the shims have a surface hardness of at least about 545 to 600 kg/mm$^2$ in order to effectively press a hologram into the surface of aluminum cans having surface hardness of about 110 to 125 kg/mm$^2$. The surface of the shims may be optionally hardened with DLC or ADC as is described above with respect to the method of FIG. 1.

Whereas particular embodiments of this invention have been described for purposes of illustration, it will be evident to those skilled in the art that numerous variations in details may be made without departing from the invention as covered by the appended claims. For example, the method of this invention can be used to emboss holograms on a variety of products such as polished metal sheet (preferably aluminum) or other articles of manufacture. It is also possible to modify this invention by embossing cans directly from the shims instead of first transferring the hologram to a print roll. In that alternative, a can is mounted on a mandrel and rotated as a shim having a hologram on it is pressed against the can by a supporting roll in a manner similar to that shown in FIG. 2. The shim could also be arcuate in shape to conform to the arcuate surface of the support roll. Such an arcuate shaped shim may be attached to and be rotated with the support roll. Print rolls used in this invention can also vary in diameter and may be smaller, the same as, or larger in diameter than the can bodies being embossed. The ADC or DLC coatings on print rolls and/or shims may also vary in thickness down to about 1,000 angstroms although they are preferably about 2,000–3,000 angstroms thick. Other modifications to the invention falling within the scope of the appended claims will be apparent to those skilled in the art.

We claim:

1. A method for imposing a holographic image on exterior surfaces of many hollow metal cylinders, comprising:

forming a positive holographic image into a surface of a shim;

impressing said positive holographic image into the outer surface of a print cylinder so as to form a negative holographic image on the exterior surface of said print cylinder; and embossing said negative image from said print cylinder seriatim into the exterior surfaces of said hollow metal cylinders so as to form a positive holographic image on each cylinder.

2. A method as set forth in claim 1 wherein said print cylinder is substantially the same diameter as said hollow metal cylinder.

3. A method as set forth in claim 1 wherein said forming comprises forming a positive holographic image on a substantially flat shim.

4. A method as set forth in claim 1 wherein said forming comprises forming a positive holographic image on the convex surface of a curved shim.

5. A method as set forth in claim 1 wherein said forming comprises forming a positive holographic image on a surface of a shim by electroforming.

6. A method as set forth in claim 1 wherein said forming comprises forming a positive holographic image on a surface of a shim by laser etching.

7. A method as set forth in claim 1 wherein said shim comprises nickel.

8. A method as set forth in claim 1 wherein said print cylinder comprises a metal.

9. A method as set forth in claim 8 wherein said print cylinder is comprised of a metal selected from the group consisting of aluminum and steel.

10. A method as set forth in claim 1 wherein said hollow metal cylinder is comprised of a metal selected from the group consisting of aluminum and steel and the cylinder has a substantially mirror-like outer surface.

11. A method as set forth in claim 10 wherein said print cylinder is aluminum.

12. A method as set forth in claim 1 wherein said shim is pressed against the exterior surface of said print cylinder by a rigid support roll.

13. A method as set forth in claim 12 wherein while impressing said positive holographic image onto said outer surface of said print cylinder, said support roll and said print cylinder are maintained substantially parallel to each other.

14. A method as set forth in claim 1 in which said print cylinder is mounted on a rigid support.

15. A method as set forth in claim 1 in which said hollow metal cylinder is mounted on a rigid support.

16. A method as set forth in claim 15 wherein the longitudinal axis of said hollow metal cylinder is maintained parallel to the longitudinal axis of said print cylinder while said negative image is embossed into the exterior surface of said hollow metal cylinder.

17. A method as set forth in claim 1 further comprising mounting said shim on a wheel having an outer surface.

18. A method as set forth in claim 17 wherein said shim is arcuate having an inner section and an outer section, said positive holographic image being formed on the outer section of said arcuate shim.

19. A method as set forth in claim 18 wherein said inner section of said shim is secured on said outer surface of said wheel.

20. A method as set forth in claim 1 further comprising applying an amorphous diamond or diamond-like coating to said outer surface of said print cylinder to substantially alleviate transfer of debris from said hollow metal cylinder to said print cylinder.

21. A method as set forth in claim 1 wherein said impressing of said positive holographic image onto the outer surface of said print cylinder is performed at a pressure of between about 500 and 700 pounds per linear inch.

22. A method as set forth in claim 21 wherein said impressing is performed at a temperature of between about 70° F. and 95° F.

23. A method as set forth in claim 1 wherein said embossing of said negative image onto said external surface of said hollow metal cylinder is performed at a pressure of between about 500 and 700 pounds per linear inch.

24. A method as set forth in claim 23 wherein said embossing is performed at a temperature of between about 70° F. and 95° F.

25. A method for imposing a holographic image on an exterior surface of a hollow metal cylinder, comprising:
    forming a positive holographic image into a surface of a shim;
    impressing said positive holographic image into the outer surface of a print cylinder so as to form a negative holographic image on the exterior surface of said print cylinder;
    hardening said exterior surface of said print cylinder after said negative holographic image has been formed thereon; and
    embossing said negative image from said print cylinder into said exterior surface of said hollow metal cylinder so as to form a positive holographic image thereon.

26. A method as set forth in claim 25 wherein said hardening comprises ion implantation onto said exterior surface.

27. A method as set forth in claim 25 wherein said hardening comprises application of an amorphous diamond coating or a diamond-like coating onto said exterior surface.

28. A method for imposing a holographic image on an exterior surface of a hollow metal cylinder, comprising:
    forming a positive holographic image into a surface of a shim;
    hardening the surface of said shim before said holographic image is impressed into the outer surface of said print cylinder;
    impressing said positive holographic image into the outer surface of a print cylinder so as to form a negative holographic image on the exterior surface of said print cylinder; and
    embossing said negative image from said print cylinder into said exterior surface of said hollow metal cylinder so as to form a positive holographic image thereon.

29. A method as set forth in claim 28 further comprising fabricating said shim by placing an amorphous diamond coating on thin gauge aluminum sheet.

30. A method for imposing a holographic image on an exterior surface of a hollow metal cylinder, comprising:
    forming a positive holographic image into a surface of a shim;
    impressing said positive holographic image into the outer surface of a print cylinder so as to form a negative holographic image on the exterior surface of said print cylinder;
    embossing said negative image from said print cylinder into said exterior surface of said hollow metal cylinder so as to form a positive holographic image thereon; and
    wherein the surface of said shim is at least 2.5 times harder than said outer surface of said print cylinder and wherein said outer surface of said print cylinder is at least 2.5 times harder than said exterior surface of said hollow metal cylinder.

31. A method of decorating a metal can body comprising the steps of:
    providing a hard metal can having a substantially mirror-like outer surface;
    providing a hard metal shim having a holographic or diffraction image thereon;

transferring said image from said shim to a metal roll having a surface hardness less than about 40% of the surface hardness of said shim;

hardening the surface of said roll after said image has been transferred to the roll; and transferring said image from said roll to said substantially mirror-like outer surface of the metal can body.

32. A method as set forth in claim 31 in which said metal can is made of a hard temper aluminum alloy.

33. A method as set forth in claim 32 in which said image is transferred from said roll to said can by mounting said can on a mandrel and rolling said metal roll against said can on said mandrel.

34. A method as set forth in claim 31 in which said metal roll has a coating selected from a group consisting of diamond like coatings and amorphous diamond coatings applied thereto.

35. A method as set forth in claim 31 in which the surface of said metal roll is hardened to be at least 2.5 times harder than the surface of said metal can.

36. A method as set forth in claim 31 in which the surface of said metal roll is hardened to be at least 4 times harder than the surface of said metal can.

37. A method as set forth in claim 31 in which the surface of said shim is at least 4 times harder than the surface of said metal roll when said image is transferred from the shim to the metal roll.

38. A method as set forth in claim 31 in which the surface of said metal shim is at least 4 times harder than the surface of said metal roll when, said image is transferred from the shim to the metal roll, and the metal roll is thereafter hardened to be at least about 4 times harder than the surface of said metal can.

39. A method as set forth in claim 30 in which said metal roll has a diameter in the range of about 2 to 4 inches.

40. A method as set forth in claim 32 in which said metal roll has a diameter of about 2.6 inches.

41. A method as set forth in claim 31 in which said metal roll is made of an aluminum alloy having a hardness of about 100 to 125 kg/mm$^2$ when said image is transferred from said metal shim to said metal roll whereafter the surface of said metal roll is hardened to at least about 545 kg/mm$^2$.

42. A method as set forth in claim 32 in which said metal can is an aluminum can having a surface hardness in a range of about 100–150 kg/mm$^2$.

43. A method as set forth in claim 31 in which the surface of said metal roll is hardened by ion implantation.

44. A method as set forth in claim 31 in which two or more holographic images are sequentially transferred to an outer surface of a metal can.

45. A method for decorating a hard temper aluminum alloy can body with a holographic image comprising:

providing at least one metal shim having a holographic image on it and having a surface hardness of at least about 550 kg/mm$^2$, mounting said shim on a cylindrical roller around at least a portion of the perimeter of the roller, providing a cup-shaped can body made of aluminum alloy having a hardness in a range of about 110–125 kg/mm$^2$ and a substantially mirror-like exterior surface, positioning said can body on a rigidly supported mandrel, and pressing said shim on said roller against the outer surface of said can body and rolling said roller with respect to longitudinal axis of said can body to transfer the image on said shim to the outer surface of said can body.

46. A method as set forth in claim 45 in which at least two of said shims are provided and are mounted end-to-end around the perimeter of said roller.

47. A method as set forth in claim 45 in which said shim is pressed against said can body under a pressure of about 500–700 pounds per linear inch of nip length between the shim and the can body.

48. A method as set forth in claim 45 in which said shim is arcuate in configuration and has a concave face mounted against said roller and a convex face bearing said holographic image.

* * * * *